United States Patent [19]

Batlle Crosas

[11] 4,300,057
[45] Nov. 10, 1981

[54] ANTI-THEFT APPARATUS FOR VEHICLES
[75] Inventor: Pedro Batlle Crosas, Gerona, Spain
[73] Assignee: Hiperblock, S.A., Gerona, Spain
[21] Appl. No.: 48,464
[22] Filed: Jun. 14, 1979
[30] Foreign Application Priority Data Jul. 4, 1978 [ES] Spain ........................ 471.433

[51] Int. Cl.³ .................................... B60R 25/08
[52] U.S. Cl. ........................ 307/10 AT; 340/63; 303/89; 180/287
[58] Field of Search ............... 180/287; 307/10 AT; 303/89; 340/63, 64, 65

[56] References Cited
U.S. PATENT DOCUMENTS 3,559,755 2/1971 Pond .................................. 180/287
3,735,834 4/1973 St. Onge ........................ 303/89 X
3,796,889 3/1974 Fradkin et al. ............... 307/10 AT
3,800,279 3/1974 Thompson ................. 307/10 AT X Primary Examiner—L. T. Hix
Assistant Examiner—James L. Dwyer
Attorney, Agent, or Firm—Wenderoth, Lind & Ponack

[57] ABSTRACT

An anti-theft apparatus for vehicles includes a permanent magnetic attraction and retention element joined to a valve incorporated in the hydraulic return circuit of the braking system of an automobile. The magnetic attraction and retention element is controlled by a dual effect coil activated only by an electronic circuit set off by specific voltages acting as an electronic code. A valve, a seal, the magnetic retention element, the dual effect coil, and the electronic circuit are housed in a tamperproof container.

7 Claims, 4 Drawing Figures

ANTI-THEFT APPARATUS FOR VEHICLES

BACKGROUND OF THE INVENTION

The theft of automobiles is one of the most frequently occurring criminal acts which the authorities are helpless to prevent.

Although the majority of cases of stolen vehicles are for the enjoyment of youths, there is an ever increasing frequency of thefts of vehicles which occur in connection with much more serious offences such as terrorist acts and robberies.

With no regard to the motives, the fact remains that the number of stolen vehicles is increasing daily and on a world wide scale and the anti-theft systems which are being added to said vehicles, either directly at the time of manufacture or subsequently, are ineffective for preventing the thefts.

One of the most commonly used systems is undoubtedly that in which the steering wheel of the vehicle is locked, once parked. However, practice has shown that the lock can be broken by exerting a violent force thereon, leaving the vehicle ready for use by merely re-establishing the connection.

The presently known systems of chains, bars, etc., which lock the steering wheel, the gear lever and the brake and/or clutch pedals can readily be broken by cutting the chain and, in addition, the locks used can be readily opened by using skeleton keys or any of the many other systems which are known and effectively employed by car thieves.

Electronic systems have also been incorporated into the multitude of apparatuses which are designed to passively protect automobiles and thus, there have appeared in the market, an infinite number of ingenious systems which, when activated by the opening of the door or any other system, set off acoustic and luminous signals which serve to draw the attention of passers-by, and to make the electric system of the vehicle inoperative.

All these systems, however, can be damaged, and the effectiveness thereof depends, to a large extent, on the ability of the installer to keep the method of deactivating secret, since operation and shutting off thereof can be readily learned by thieves who will simply acquire one of these systems in the market and thereby study the characteristics thereof.

In any case, the vehicle is not immobilized and can always be moved to another site where it can be peacefully worked on by the thieves.

SUMMARY OF THE INVENTION

The object of the present invention is to provide an improvement in an anti-theft apparatus for vehicles, the embodiment of which has a novel design which is different from those which are known and which consists of locking the four wheels of the vehicle and thus, preventing any type of movement other than the complete elevation of the vehicle by means of a crane, and the subsequent shifting thereof to the loading platform of a truck as a result of precluding the hauling of the vehicle through the locked wheels.

The locking of the wheels is achieved by using the brake system of the vehicle, and does not create any secondary effects which affect the operation thereof.

The locking means is activated and deactivated by using the electrical power source of the automobile. However, since the maintenance of the wheels in a locked or unlocked condition is not directly related to the electrical power source, the wheels will always be maintained locked or unlocked regardless of whether or not the automobile is connected to its electric power supply, and whether or not its battery is in good condition.

The deactivation or activation means can be visible. Nonetheless, deactivation can only be effected by a person who knows a preset electronic code for each apparatus.

On the other hand, the apparatus which creates and maintains the locking condition, as well as the means to control the same, are incorporated into a tamperproof assembly which is secured to the body of the vehicle, while the control means, which activates the control elements, is removably located in the dashboard of the vehicle and can become visible with all the other apparatuses, provided that the electronic code which identifies the unlocking order is known.

Since, as has already been stated, maintaining the apparatus in a locked or unlocked condition is not directly related to the electrical power supply of the vehicle and as such, it is self-sufficient, there is no other means for supplying energy for the change from one position to another, except through the electronic code which can be made as complex as is necessary.

Theft or removal of the vehicles is practically impossible, except by completely elevating the vehicle through the use of a crane or the like which would allow for the apparatus to be dismantled thus, making the brake circuit useless after having sufficiently raised the vehicle which, since it cannot then be braked, must be hauled away.

According to the above-description, the improvements in question consist mainly at joining a permanent magnet attraction and retention element to a valve which is incorporated into the hydraulic return circuit of the braking system of an automobile. The magnetic attraction and retention element is controlled by a dual effect coil which can only be activated by an electronic circuit which is itself set off only by specific voltages which make up an electronic code which activates the above described elements which are held in a tamperproof container.

The return circuit of the hydraulic brake system of an automobile is locked by an electromagnetic valve, which includes a dual effect coil having two windings. Further, there is a seal housed in the core of the valve which defines the return circuit for the brake fluid.

The windings have opposing polarities and are capable of positioning the core, together with the seal, at two different positions, one of the end positions being for maintaining the brake circuit open while at the other end closes the circuit and which as a result of activation of the brake, maintains the brake activated and thus, locks the vehicle.

The dual effect coil has a permanent magnet casing which can be guided and which is capable of maintaining the core, which makes up the seal of the circuit, in any of the opposing positions thereof.

Each one of the coils has a non-simultaneous independent activating means.

The coil which acts on the core which is included in the seal for attracting the core to the locking position of the return circuit of the brake fluid, is controlled by two simultaneously-operating buttons. The coil which acts on the core for attracting it to the opposite or inoperative position for leaving the brake circuit open, is controlled by an electronic programming device which includes generation of a plurality of different or like voltages which operate as a lock for the electronic code which can be operated by a keyboard. The programming device as well as the remaining elements which make up the electronic lock, and the electromagnetic valve, are included in a tamperproof assembly which is solidly fastened to the body of the automobile.

Each one of the buttons of the keyboard which make up the electronic code is set at a predetermined voltage which is always constant for the same code. The keyboard is removably connected to a comparator circuit which, in an active condition, always receives a voltage from the electronic programming device.

The programming device includes two or more different or like voltages which are compared, in order or independently, with an equal number of voltages from the keyboard.

The comparator, when like voltages are encountered coming from each one of the buttons in the order and number established in the programming device, activates the programming device by generating a pulse for each coincidence of voltage, with each pulse determining a change in the position of the programming device. Each change in position makes up a new voltage presence in the comparator which is generated by the programming device waiting for the correct voltage to be generated from the keyboard.

The presence of voltage in the comparator which does not coincide with that coming from the programming device, causes the programming device to return to the original condition, and to disregard or cancel the advance position which has been reached.

The attainment of all the changes in position of the programming device causes generation of a signal which is directed to a monostable circuit which in turn sends a pulse, having a specific time duration, to a potential circuit which acts on the coils of the electromagnetic valve. The positioning of the seal in the inoperative position is caused by the operation thus, the brake circuit is left open.

BRIEF DESCRIPTION OF THE DRAWINGS

The features and advantages of the present invention will become more apparent from the following description, taken with reference to the accompanying drawing, in which.

DETAILED DESCRIPTION OF THE INVENTION

All the characteristics and the various elements making up the invention will now be referred to more specifically with the help of the drawings which, as an example, show the previously described preferred embodiment.

With reference to the figures, the following elements are noted.

Figure 1:
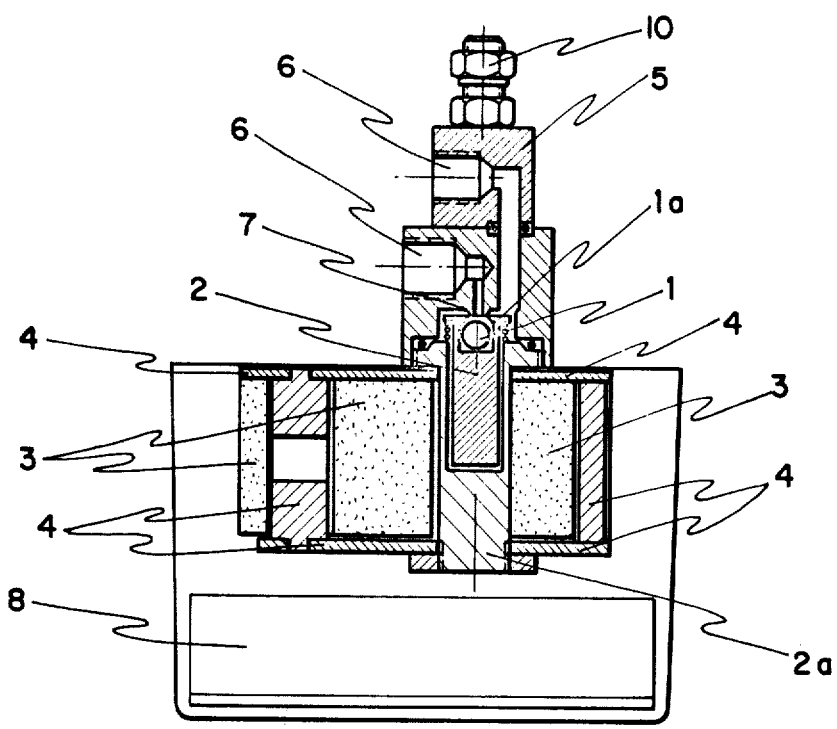
FIG. 1 is a schematic vertical cross section view, in elevation, of the electromagnetic valve assembly and showing the elements which make up the electronic lock in the housing.

FIG. 1 shows the following elements: 1 is a ball seal, 1a is a ball seal extractor; 2 is a movable core; 2a is a fixed core; 3 is a dual effect coil; 4 is a permanent magnet guidable casing; 5 is the body of the valve; 6 is an inlet duct; 6a is an outlet duct; 7 is a seat for the ball 1 which makes up the seal; a housing 8 for the electronic element; a tamperproof container 9; and a means 10 for fastening to the frame.

Figure 2:
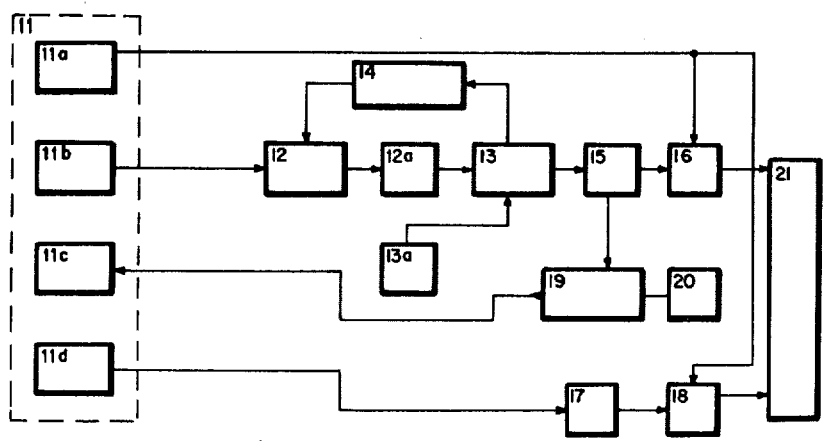
FIG. 2 is a block diagram of the electronic elements of the present invention.

FIG. 2 shows the following elements: 11 is an assembly of push-buttons; 11a is a contact button, 11b is an electronic code; 11c is a luminous control signal; 11d is a blocking button; 12 is a comparator; 12a is a signal identification circuit; 13 is a meter; 13a is a zero adjusting circuit; 14 is a programming device; 15 is an unlocking monostable multivibrator, (herewith monostable); 16 is an unlocking power stage; 17 is a locking monostable multivibrator, 18 is a locking power stage; 19 is a computer circuit; 20 are auxiliary relays for the computer circuit; and 21 is a dual effect coil.

Figure 3:
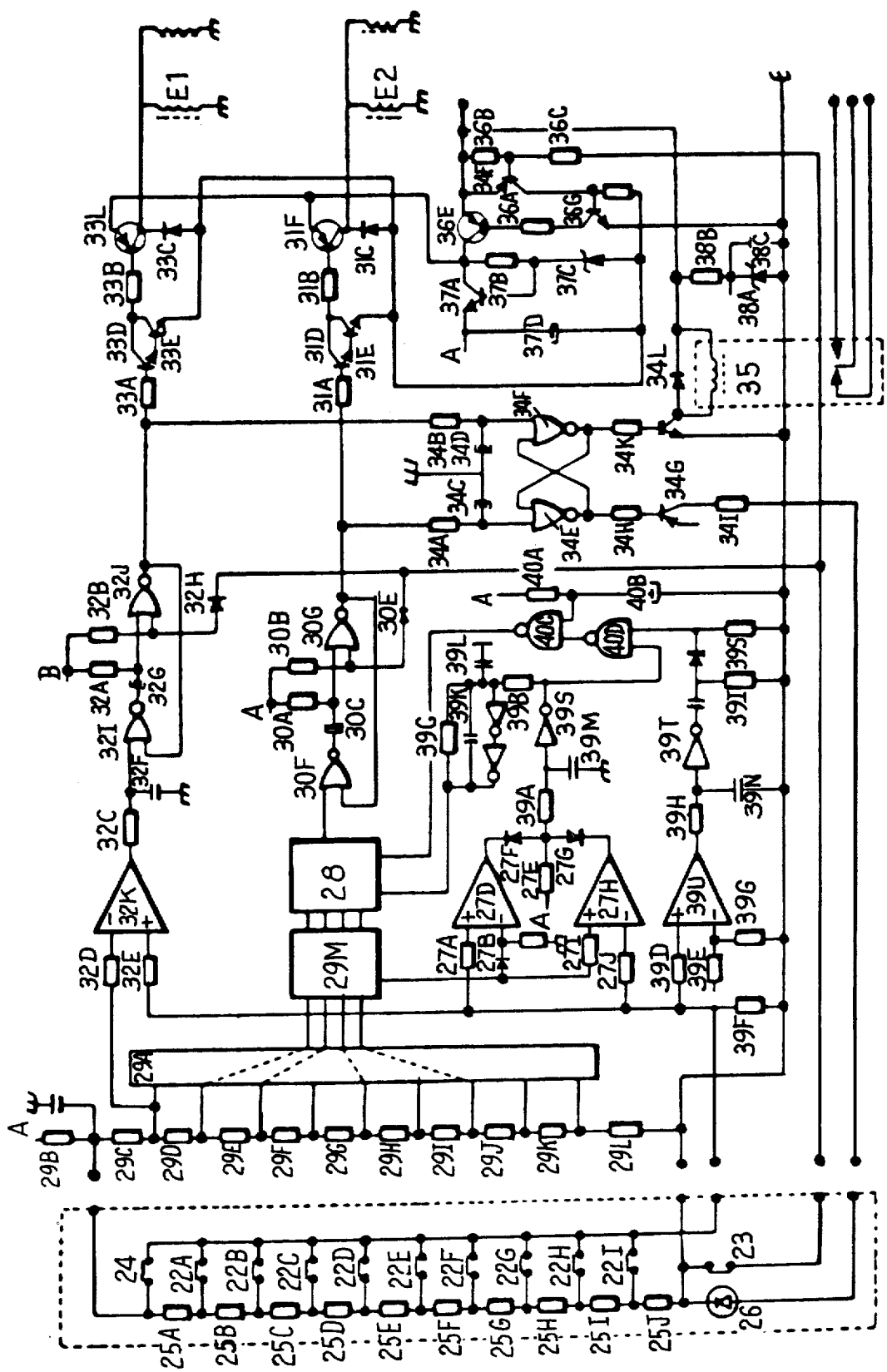
FIG. 3 is a circuit diagram of the electronic system of the present invention.

FIG. 3 shows the following elements: 22a to 22i are buttons for the keyboard by means of which the electronic code is keyed in; 23 is a contact button; 24 is a locking button; 25a to 25j are resistances which determine the various voltages which activate the electronic lock; 26 is a luminous diode which makes up the signalling device; 27a, 27e, 27i and 27j are auxiliary diodes for the comparator; 27d and 27h are operational amplifiers for the comparator; 28 is an integrator circuit which makes up the meter; 29a are bridges which connect the resistances which are chosen as a code; 29b to 29l are resistances which determine the various reference voltages of the code; 29m is an integrator circuit which changes the various voltages of the code according to the meter and applies them to the comparator; 30a and 30b are auxiliary resistances for the unlocking monostable; 30c is auxiliary condensor for the unlocking monostable; 30f and 30g are logic gates which make up the monostable; 31a and 31b are auxiliary resistances for the unlocking power stage; 31c is an auxiliary diode for the unlocking power stage; 31d, 31e and 31f are transistors for the unlocking power stage; 32a and 32e are auxiliary resistances for the locking monostable; 32f and 32g are auxiliary condensers for the locking monostable; 32h is an auxiliary diode for the locking monostable; 32i and 32j are logic gates; 32k is an operational amplifier; 33a and 33b are auxiliary resistances; 33c is an auxiliary diode for the locking power stage; 33d, 33e and 33f are transistors for the locking power stage; 34a and 34b are auxiliary resistances for the computer; 34c and 34d are condensers; 34e and 34f are logic gates; 34 is an auxiliary transistor for the luminous diode; 34h and 34i are auxiliary resistances; 34j is a relay activating transistor; 34k is an auxiliary resistance for the relay activating transistor; 34l is an auxiliary diode; 35 is an auxiliary relay; 36a to 36d are auxiliary resistances; 36e to 36g are safety transistors which are controlled by contact button 23; 37a is a voltage stabilizing transistor; 37b is an auxiliary resistance; 37c is a standard stabilized voltage Zener diode; 37d is an auxiliary condenser for the voltage stabilizing assembly; 38a is a Zener diode; 38b is an auxiliary resistance; and 38c is an auxiliary condenser; 39a to 39j are auxiliary resistances for the signal identification circuit; 39k to 39o are auxiliary condensers for the signal identification circuit; 39p is a diode; 39q to 39t are inverter circuits; 39u is an operational amplifier; 40a is a resistance for the zero adjusting circuit; 40b is an auxiliary condenser; and 40c and 40d are logic gates.

Figure 4:
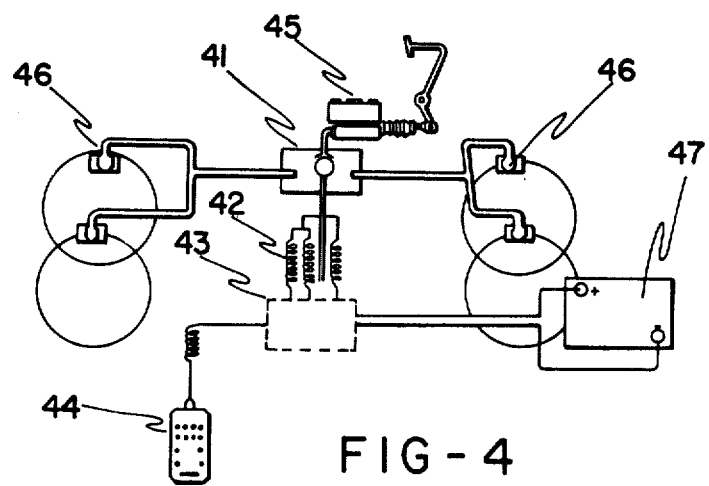
FIG. 4 is a schematic diagram of the assembly as applied to an automobile brake system.

FIG. 4 shows the following elements: 41 is an electromagnetic valve; 42 is an electromagnetic valve coil; 43 is an electronic circuit which determines the lock and activating stages; 44 is a control push-button panel; 45 is a brake pump; 46 are brake drums; and 47 is a battery.

In the preferred embodiment of the invention, as more specifically described, the coil 3 is made up of two concentric parts and the core of the coil is, in turn, made up of two parts, one 2 which is movable and the other 2a fixed.

The fixed part 2a of the core has, at the coupling front end of the movable part 2, a coaxial housing in which the movable part 2 is housed. The movable part 2 has a recess in which a magnetic metal ball 1 is housed.

The assembly which is made up by the coil 3 and the cores 2 and 2a, is enclosed in a permanent magnet guidable casing 4 which is attached to the fixed core 2a and by means of which the assembly is solidly fastened to the valve body 5. The valve body 5 includes a chamber having two ducts connected, an inlet duct 6 and an outlet duct 6a, which are bidirectional for allowing the flow into the casing 4 when the valve is in the inoperative position, when the brake circuit is normally activated.

There is a seat at the outlet side of the inlet duct 6 to the chamber. Further, there is a seat 7 for the ball seal 1 as well as an extractor 1a which is solidly fastened to the movable core 2 between the seat 7 and the ball 1, and which serves the purpose of separating the ball 1 from the seat 7 when ball 1 is in an operative position.

There is a spring (see FIG. 1) located between the extractor 1a and the movable core 2, for separating the movable core 2 from the fixed core 2a.

The distance between cores is of about two and a half decimals and the seal displacement does not exceed two millimeters.

There is a fastening means 10 located on the valve body for solidly fastening the assembly of the frame of the automobile.

The complete electronic device is enclosed in a tamperproof container 8 which also houses the other electronic device which operates as the electronic lock and as the control element for the electronic device which controls the valve.

The electronic device which is enclosed in the tamperproof container includes a comparator 12 which, on the one side, is connected to a signal identification circuit 12a and, on the other side, to a programming device 14.

Both elements, the programming device 14 and the comparator 12, are connected to a meter 13 which, on one side, is connected to the zero-adjusting circuit 13a, while on the other side, is connected to a monostable 15 which is connected to a power stage 16 connected to the dual effect coil 21.

The monostable 15 is connected to a computer 19 which is connected on one side, to an auxiliary relay 20 and, on the other side, the monostable 15 is connected indirectly to another monostable 17 through the dual effect coil 21.

The above described, are connected through a cabling system, and by a conventional connector, to the elements which are housed in a removable and portable housing and which make up the electronic code which is activated by a keyboard. The keyboard itself includes a contact button 23a, a locking button 24, a luminous diode 26 which indicates an activation signal, and a plurality of buttons 22a to 22i by means of which the electronic code which operates in the previously described assembly is introduced.

The group of buttons are connected to the comparator 12 of the electronic code, while the contact button 23 is connected to both power stages 16 and 18.

The locking button 24 acts directly on the monostable 17 which itself acts on the power stage 18 which is controlled by the part of the dual effect coil 21 and which causes the locking.

The luminous diode 26 which makes up or indicates the operating signal is directly connected to the computer 19 so that, by means of this connection, the operator of the vehicle, can know prior to operating the vehicle, that unlocking of the brakes has not occurred. Additionally, the luminous signal can be aided or substituted for by an acoustic signal.

The comparator 12 is made up of two diodes 27f and 27g, resistances 27a, 27e 27l and 27j and two operational amplifiers 27d and 27h and which have as a purpose the identification of the electronic code, which is introduced through the keyboard, as being correct or incorrect.

The meter 13 is made up of an integrator circuit 28. The programming device 14 includes resistances which determine the code and which make up the electronic lock. An integrator circuit 29m operates to change the various voltages of the code according to the meter and to apply them to the comparator 12.

The monostable 15, which is connected to the meter 13, operates on the unlocking coil 21 and controls the time during which it will be activated by the power stage 16. The monostable 15 has two auxiliary resistances 30a and 30b, a condenser 30c, a diode 30e and two logic gates 30f and 30g, and the power stage has two auxiliary resistances 31a and 31b, a diode 31c and three transistors 31d, 31e and 31f.

Further, the meter 13 includes, the programming device 14, the comparator 12, the unlocking monostable 15, and the keyboard 11, and a voltage stabilizer which includes a voltage stabilizing transistor 37a, an auxiliary resistance 37b for the transistor 37a, a "Zener" diode 37c as a standard for the stabilized voltage, and an auxiliary condenser 37d.

The 9-volt voltage stabilizer has been included to ensure operation of the assembly in spite of possible losses in voltage of the battery which makes up the electric power for the vehicle.

On the other hand, the computer 19 and the locking monostable 17 are aided by a stabilizer which includes a standard voltage Zener diode 38a, a resistance 38b, and an auxiliary condenser 38c for stabilizing the voltage.

In this way, there are two voltages A and B acting on the assembly.

The signal identification circuit 12a is connected between the comparator 12 and the meter 13 and made up of a plurality of signal identification resistances 39a to 39j, four condensers 39k to 39o, a diode 39p, four inverter circuits 39q to 39t, and an operational amplifier 39u.

The contact button 23 includes four auxiliary resistances 36a to 36d and three transistors 36e, 36f and 36g.

The luminous diode has two resistances 34h and 34i and a transistor 34 connected thereto.

The zero adjusting circuit 13a includes auxiliary resistance 40a and two logic gates 40c and 40d.

All the components of each one of the elements making up the assembly are conventional. They are available in the market, and have been used since present-day technology has not provided the industry with other more simple or cheaper devices for carrying out the precise functions which are necessary in the described embodiment of the present invention. However, the practical possibilities of the invention are not, as a result limited, since the development of integrated circuits which can accomplish the suitable functions will, if practice so deems fit, be used to replace some of the elements which are presently used.

According to the above description, and referring to the described figures, the operation of the device is as follows.

LOCKING

This operation occurs only when the vehicle has been parked and the motor has been turned off. It is caused by activating two button simultaneously as shown by 11a and 11d in FIG. 2, and 23 and 24 in FIG. 3.

According to the block diagram of FIG. 2, button 11a feeds the power stage 16 and 18 through the various component elements thereof, as well as the meter, programming device, comparator, and locking monostable circuits.

Button 11d starts the operation of the locking monostable 17 and all the components thereof, which in turn activates the locking power stage 18 which supplies power to the electromagnetic valve 21, more particularly the locking power stage 18 acts on the dual effect coil (reference 3m FIG. 1), and causes the movable core (reference 2, FIG. 2) to thrust, thereby placing the seal (reference 1, FIG. 1) in a closed position on its seat 7.

When the brake pedal is activated, the brake valve 45, as shown in FIG. 4, activates the drums 46, which locks the wheels.

The luminous diode 26, as shown in FIG. 3, is switched off and the relay 20 of FIG. 2, is at rest.

UNLOCKING

Before putting the vehicle into operation, and once the contact is established, button 11a is activated, and, by maintaining the button pressed, the buttons 22a, 22b, 22d and 22f which, according to FIG. 3, define the code, are acted on.

Pressing of the button should always be done according to the order indicated, since a change in the order or an error will return the code to its initial position, forcing initiation of another sequence.

Activation of button 11a determines a voltage having a value which will be that identified by the pressings of the code, at the output of the programming device.

When button 22a is activated, the voltage of which is equal to the voltage at the output of the programming device 14, as indicated by 1a in FIG. 2, the comparator 12 generates an output which is identified as correct in the signal identification circuit 12a thus causing the meter 13 to advance one stage, while the programming device 14 changes to another voltage.

When button 22b is activated, the same sequence occurs, and this also occurs when button 22d is activated.

Further, when button 22c is activated, the programming device, which cannot now progress through any more stages, sends a signal to the unlocking monostable 15, as shown in FIG. 2, which sends a signal to the power stage 16 which activates the coil 21, the luminous diode 26 and the relay 20.

All of this will occur only while the button 11a is maintained activated, as shown in FIG. 2.

When coil 21 is activated, the movable core 2 of FIG. 1, is attracted by the fixed core 2a, and the extractor 1a acts on the ball seal to unlock the circuit which is at rest.

When no electric voltage is applied, the permanent magnet 4 magnetically acts on the movable core 2 and to lock the seal 1 therein.

I claim:
1. An anti-theft apparatus for use in vehicles, said vehicles being of the type having a brake system which includes a hydraulic return circuit, said apparatus comprising:
   valve means located in the hydraulic return circuit of the brake system of a vehicle, said valve means being capable of being switched between two positions respectively for closing off and for opening and allowing fluid flow in one direction through said valve means and through the hydraulic return circuit for respectively locking and unlocking the brakes of the vehicle;
   permanent magnet attraction and retention means operatively associated with said valve means for causing said valve means to be closed off and for magnetically holding said valve means in said closed position when and after said permanent magnet attraction and retention means has been activated;
   a dual effect coil operatively connected to said permanent magnet attraction and retention means for controlling the operation thereof;
   electronic circuit means connected to said dual effect coil for activating said dual effect coil and said electronic circuit means activating said dual effect coil only when specified voltages, making up an electronic code, are transmitted thereto; and
   a tamperproof container for housing said valve means, permanent magnet attraction and retention means, dual effect coil, and electronic circuit means;
   wherein said valve means comprises an electromagnetic valve having said dual effect coil therein, said electromagnetic valve having a movable core and a seal, said movable core being movable between two positions, a first position away from said seal and second position against said seal, respectively, for opening and closing off brake fluid flow therethrough, wherein the brakes of the vehicle are locked when said core is in said closed position, said dual effect coil having two windings which have opposing polarities and said winding being for causing movement of said movable core between said two positions for locking and unlocking the brakes of the vehicle; and wherein said dual effect coil has a permanent magnet casing for causing said movable core to be held in any one of said two positions; and wherein each of said windings has independent activating means for activating said windings non-simultaneously; and wherein said electronic circuit means includes:
   two buttons connected to said dual effect coil, which are simultaneously operated for activating the one of said two windings which cause said movable core to move to said locking position;
   a keyboard which is set at predetermined voltages for generating said electronic code; and
   an electronic programming device having said voltages making up said electronic code preprogrammed thereinto, said programming device connected between said keyboard and the other of said two windings which cause said movable core to move to said unlocked position for activating the other of said two windings for causing said movable case to move to said unlocked position when said electronic code is generated from said keyboard, and said programming device being housed in said tamperproof housing.

2. An anti-theft apparatus for use in vehicles, said vehicles being of the type having a brake system which includes a hydraulic return circuit, said apparatus comprising:

valve means located in the hydraulic return circuit of the brake system of a vehicle, said valve means being capable of being switched between two positions respectively for closing off and for opening and allowing fluid flow in one direction through said valve means and through the hydraulic return circuit for respectively locking and unlocking the brakes of the vehicle;

permanent magnet attraction and retention means operatively associated with said valve means for causing said valve means to be closed off and for magnetically holding said valve means in said closed position when and after said permanent magnet attraction and retention means has been activated;

a dual effect coil operatively connected to said permanent magnet attraction and retention means for controlling the operation thereof;

electronic circuit means connected to said dual effect coil for activating said dual effect coil and said electronic circuit means activating said dual effect coil only when specified voltages, making up an electronic code, are transmitted thereto; and a tamperproof container for housing said valve means, permanent magnet attraction and retention means, dual effect coil, and electronic circuit means;

wherein said dual effect coil has a permanent magnet casing for causing said movable core to be held in any one of said two positions; and wherein each of said windings has independent activating means for activating said windings non-simultaneously; and wherein said electronic circuit means includes:

two buttons connected to said dual effect coil, which are simultaneously operated for activating the one of said two windings which cause said movable core to move to said locking position;

a keyboard which is set at predetermined voltages for generating said electronic code; and an electronic programming device having said voltages making up said electronic code preprogrammed thereinto, said programming device connected between said keyboard and the other of said two windings which cause said movable core to move to said unlocked position for activating the other of said two windings for causing said movable case to move to said unlocked position when said electronic code is generated from said keyboard, and said programming device being housed in said tamperproof housing.

3. An anti-theft apparatus as in claim 1 or 2, wherein each button of said keyboard corresponds to a constant predetermined voltage, said electronic circuit means further comprising a comparator circuit connected to said electronic programming device for receiving a voltage therefrom and said keyboard being removably connected to said comparator circuit.

4. An anti-theft apparatus as in claim 3 wherein said voltages making up said electronic code which are programmed into said programming device are at least two different voltages.

5. An anti-theft apparatus as in claim 4 wherein said comparator is capable of generating a pulse to said electronic programming device each time a voltage which corresponds to a voltage of said programmed electronic code is transmitted from said keyboard to cause said programming device to transmit a subsequent different voltage of said electronic code to said comparator for awaiting the next voltage of said electronic code to be transmitted from said keyboard.

6. An anti-theft apparatus as in claim 5 wherein said programming device returns to the initial electronic code state when an incorrect electronic code voltage is transmitted from said keyboard.

7. An anti-theft apparatus as in claim 6 wherein said electronic circuit means further comprises a monostable circuit connected to said programming device for transmitting a specified time duration pulse to a power circuit for causing said power circuit to cause said windings to move said movable core to said unlocked position when the complete electronic code has been transmitted from said keyboard, said complete transmitted electronic code causing said programming device to transmit a signal for activating said monostable.

* * * * *